(12) United States Patent
Tharpe et al.

(10) Patent No.: US 10,450,694 B2
(45) Date of Patent: Oct. 22, 2019

(54) SYSTEM AND METHOD OF GENERATING A PATTERN OR IMAGE ON FABRIC WITH LINEAR LASER IRRADIATION, FABRIC MADE BY SAID METHOD, AND PRODUCTS MADE WITH SAID FABRIC

(71) Applicant: REVOLAZE, LLC, Westlake, OH (US)

(72) Inventors: Ralph Bernarr Tharpe, Ronda, NC (US); Darryl J. Costin, Jr., Avon, OH (US)

(73) Assignee: RevoLaze, LLC, Westlake, OH (US)

( * ) Notice: Subject to any disclaimer, the term of this patent is extended or adjusted under 35 U.S.C. 154(b) by 608 days.

(21) Appl. No.: 14/838,175

(22) Filed: Aug. 27, 2015

(65) Prior Publication Data
US 2016/0060807 A1  Mar. 3, 2016

Related U.S. Application Data

(60) Provisional application No. 62/042,496, filed on Aug. 27, 2014.

(51) Int. Cl.
*D06M 10/00* (2006.01)
*B23K 26/361* (2014.01)
(Continued)

(52) U.S. Cl.
CPC ......... *D06M 10/005* (2013.01); *B23K 26/352* (2015.10); *B23K 26/361* (2015.10); *B23K 26/362* (2013.01); *B23K 26/38* (2013.01); *B23K 26/70* (2015.10); *D06B 11/0096* (2013.01); *D06C 23/02* (2013.01); *D06H 1/00* (2013.01);
(Continued)

(58) Field of Classification Search
None
See application file for complete search history.

(56) References Cited

U.S. PATENT DOCUMENTS 5,039,078 A * 8/1991 Blessing ............ A41H 43/0228
271/1
5,205,232 A * 4/1993 Sadeh .................. A43D 119/00
112/475.03

(Continued)

FOREIGN PATENT DOCUMENTS

| WO | 0013805 A1 | 3/2000 |
| WO | 0125824 A2 | 4/2001 |

*Primary Examiner* — Jacob T Minskey
*Assistant Examiner* — Baileigh Kate Darnell
(74) *Attorney, Agent, or Firm* — Berenato & White, LLC

(57) ABSTRACT

A method of scribing abrasion aesthetics, patterns, images, serial numbers, ply markings and/or other information, such as sizing or care information, on fabric such as denim, before or during the fabric cutting process is provided. The method comprises loading the panel abrasion software, pattern marker software, and fabric scribing software; placing the fabric on a flat surface under at least one laser; laser scribing ply numbers, serial labels, fabric markers, and panel abrasions on the fabric; cutting the fabric into fabric lengths; spreading the pre-abraded and pre-marked fabric lengths on top of each other to create multiple plies in precise alignment; cutting shaped panels along the lines of the pattern marker with a conventional knife, laser, or other appropriate cutting tool; and stacking the abraded, labeled and shaped panels robotically or manually for sewing.

23 Claims, 14 Drawing Sheets

(51) Int. Cl.
*D06B 11/00* (2006.01)
*B23K 26/352* (2014.01)
*D06P 5/13* (2006.01)
*D06P 5/15* (2006.01)
*D06P 5/20* (2006.01)
*D06Q 1/02* (2006.01)
*D06C 23/02* (2006.01)
*B23K 26/70* (2014.01)
*B23K 26/362* (2014.01)
*B23K 26/38* (2014.01)
*D06H 1/00* (2006.01)
*D06H 7/00* (2006.01)
*B23K 103/00* (2006.01)

(52) U.S. Cl.
CPC ............... *D06H 7/00* (2013.01); *D06P 5/13* (2013.01); *D06P 5/15* (2013.01); *D06P 5/2005* (2013.01); *D06Q 1/02* (2013.01); *B23K 2103/38* (2018.08)

(56) References Cited

U.S. PATENT DOCUMENTS

| | | | | |
|---|---|---|---|---|
| 5,567,207 A | * | 10/1996 | Lockman | D06B 11/0096 8/115.52 |
| 5,990,444 A | | 11/1999 | Costin | |
| 6,090,158 A | * | 7/2000 | McLaughlin | D06C 23/02 223/1 |
| 6,140,602 A | | 10/2000 | Costin | |
| 6,160,568 A | * | 12/2000 | Brodsky | B23K 26/032 347/238 |
| 6,252,196 B1 | | 6/2001 | Costin et al. | |
| 6,275,250 B1 | * | 8/2001 | Sanders | B23K 26/032 347/237 |
| 6,315,202 B2 | | 11/2001 | Costin et al. | |
| 6,495,237 B1 | | 12/2002 | Costin | |
| 6,499,513 B1 | * | 12/2002 | Couch | A41H 3/08 112/470.03 |
| 6,528,758 B2 | * | 3/2003 | Shaffer | D06B 11/0096 219/121.68 |
| 6,576,862 B1 | | 6/2003 | Costin et al. | |
| 6,664,505 B2 | | 12/2003 | Martin | |
| 6,685,868 B2 | | 2/2004 | Costin | |
| 6,753,501 B1 | | 6/2004 | Costin, Sr. et al. | |
| 6,807,456 B1 | | 10/2004 | Costin, Jr. et al. | |
| 6,819,972 B1 | | 11/2004 | Martin et al. | |
| 6,858,815 B1 | | 2/2005 | Costin | |
| 7,005,603 B2 | * | 2/2006 | Addington | G09F 3/00 219/121.69 |
| 7,318,377 B2 | | 1/2008 | Espy et al. | |
| 7,699,896 B1 | | 4/2010 | Colwell | |
| 8,071,912 B2 | | 12/2011 | Costin, Sr. et al. | |
| 8,460,566 B2 | | 6/2013 | Costin, Jr. | |
| 8,529,775 B2 | | 9/2013 | Costin et al. | |
| 8,585,956 B1 | * | 11/2013 | Pagryzinski | B41M 5/267 264/400 |
| 8,921,732 B2 | | 12/2014 | Costin et al. | |
| 9,050,686 B2 | | 6/2015 | Costin, Sr. et al. | |
| 2002/0138170 A1 | * | 9/2002 | Onyshkevych | G06Q 30/06 700/130 |
| 2003/0083762 A1 | * | 5/2003 | Farrah | G06Q 10/06 700/97 |
| 2003/0139840 A1 | * | 7/2003 | Magee | D06B 11/0059 700/133 |
| 2010/0176101 A1 | * | 7/2010 | Costin | B44C 1/228 219/121.69 |

* cited by examiner

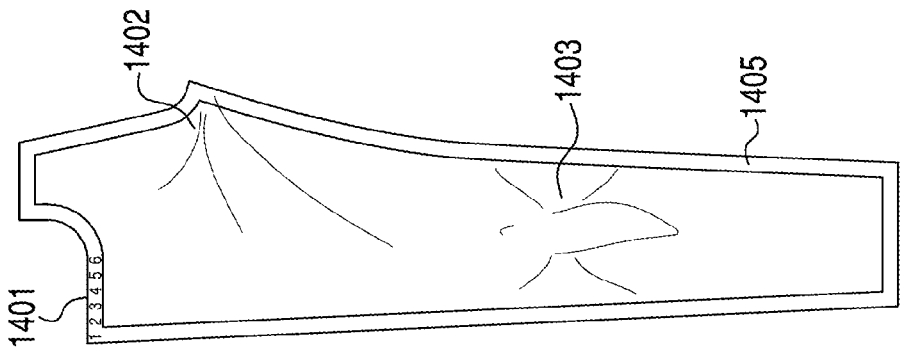
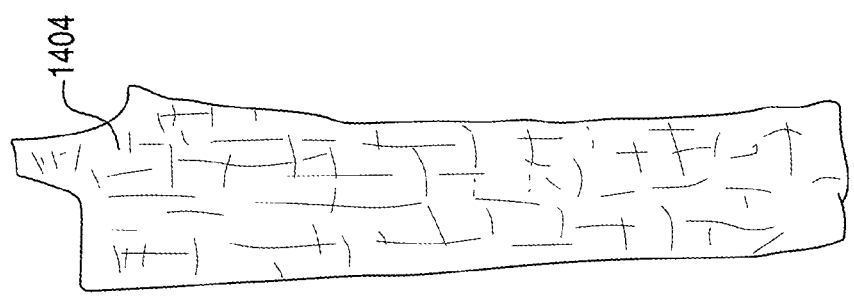
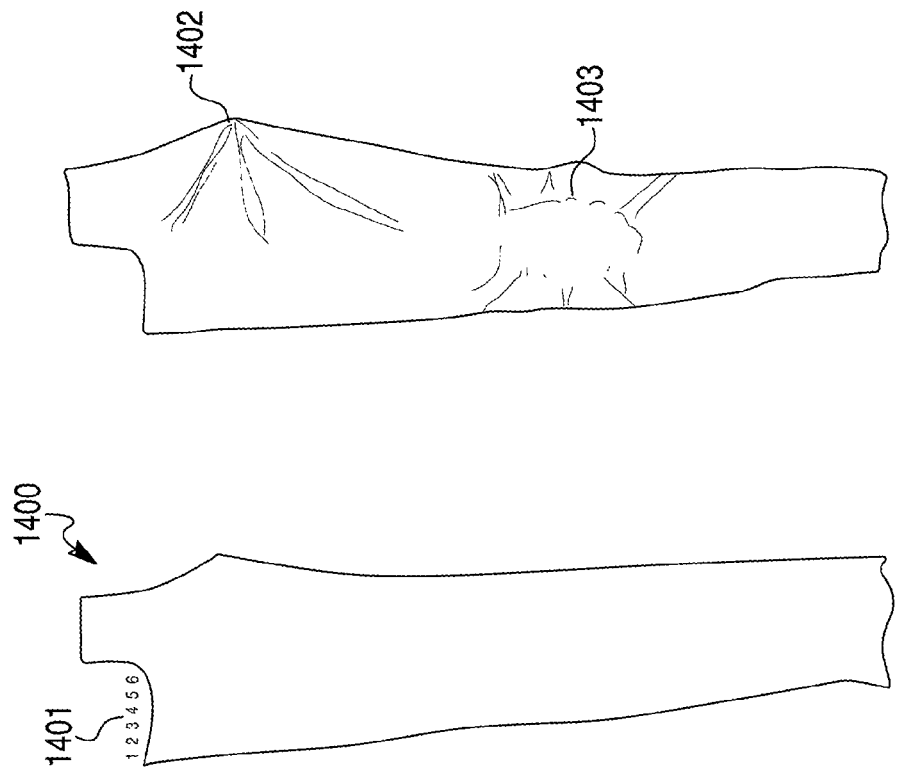
FIG. 14A  FIG. 14B  FIG. 14C  FIG. 14D

SYSTEM AND METHOD OF GENERATING A PATTERN OR IMAGE ON FABRIC WITH LINEAR LASER IRRADIATION, FABRIC MADE BY SAID METHOD, AND PRODUCTS MADE WITH SAID FABRIC

CROSS-REFERENCE TO RELATED APPLICATIONS AND CLAIM TO PRIORITY

This application is related to U.S. Application No. 62/042,496 filed on Aug. 27, 2014, the entire disclosure of which is herein incorporated by reference, and to which priority is claimed.

FIELD OF THE INVENTION

The present invention generally relates to pre-assembly surface treatment of fabric with a laser. More specifically, the present invention relates to a system and method of generating a pattern or image on a surface of fabric, such as denim, with laser irradiation, the fabric resulting from such treatment, and garments and other products made with the thus treated fabric.

BACKGROUND OF THE INVENTION

Fabric, such as denim, can be abraded to simulate a worn look. Conventionally, a wet process such as a stone and/or an enzyme process is applied to the fabric, typically after the fabric has been assembled into a garment, to create a faded and worn look. Specifically, an enzyme wash in combination with an agitation element, such as sand, stones or rocks, removes color from a ridged denim fabric to develop a contrasting pattern of variable color intensities creating an abraded and stonewashed look. For example, the faded areas of the denim fabric can correspond to areas where stones or rocks contact the fabric during the enzyme washing process. However, traditional stonewash and/or enzyme processes have numerous drawbacks. For example, each manufacturing cycle requires extensive time to create the abraded stonewashed look. In addition, the process uses a significant amount of enzymes and water, the handling and disposal of which has a substantial environmental impact.

Another method of abrading fabric involves manually abrading garments or products after assembly. Garments, such as denim jeans, or products formed of panels that have not been abraded pre-assembly, may be mounted on a mannequin or a machine and hand abraded with sandpaper or grinding tools to simulate wear. However, hand abrading is time, labor and cost intensive.

Recently, lasers have been proposed to process graphics and patterns onto a surface of a fabric, thereby creating different looks using a dry process. However, re-creating a wet process such as an enzyme wash or a stonewash look using laser processing techniques is difficult due to the unique characteristics created during an enzyme wash and a stonewash, where each garment or product differs from the other. This current process is expensive and slow, as it requires the garment or product to be mounted on a machine, laser treated on a first side, and then turned around for laser treatment of a second side. While laser abrading or imaging an assembled product is somewhat less labor intensive, it is still time consuming and labor intensive because the garment or product still has to be changed from back to front and doffed off the machine. Laser etching of an assembled product is also less accurate because an assembled product is not flat and, therefore, not all surface areas of the product are equidistant from the laser, resulting in a lased image or pattern with lower resolution. Furthermore, certain areas of an assembled product, such as the crotch area of a jean, cannot easily be accessed and treated by a laser. Moreover, implementing uniform, repeating patterns may not adequately capture the contrast in color intensities that create an atheistically pleasing enzyme and stonewash pattern.

Prior patents U.S. Pat. Nos. 6,495,237 and 6,616,710 disclose methods and systems for irradiating various substrates with a laser in order to apply a graphic to the surface. Specifically, the '237 patent discloses methods to create a stone wash image and the '710 patent discloses use of a laser to simulate an enzyme wash.

Commercial implementation of those techniques, particularly implementation across full width rolls of denim, in order to create a stonewash and a ring spun image has resulted in improved techniques disclosed in U.S. Patent Publication No. 2015/0079359, which is incorporated herein by reference, to allow even more realistic images to be lazed onto denim through modification of the coloring of the dyed fabric.

In any case, regardless of the abrasion process used, sizing, style and care instructions still need to be added with a conventional sewn-in label. Conventional labeling applications involve printing labels and then sewing them into the garment. However, such labels are often itchy, large, unsightly, and tend to fade with time and washing until they are illegible.

Therefore, there remains a need for a method and system that replaces, improves upon or reduces the use of wet and dry processes, eliminates post-assembly manual or laser abrading, avoids use of any chemical processing as well as sewn-in labels. There also remains a need for a method and system that is less labor and time intensive, and that is more efficient.

SUMMARY OF THE INVENTION

According to an aspect of the invention, there is provided a system that simultaneously spreads fabric, abrades and scribes the fabric with a laser, cuts the fabric in lengths, and cuts the fabric into shaped panels ready for assembly into garments and other end products.

According to another aspect of the invention, there is provided a method of pre-assembly laser abrasion of fabric, preferably denim or twills, with laser processing to achieve a high resolution laser abrasion pattern or image. Processing of the fabric may be accomplished through multiple passes of a single laser or multiple lasers each lazing an individual pass or section of fabric. Further, the fabric may be cut before or after the laser abrading and/or etching. Moreover, the fabric can be laser abraded and/or etched on one or both sides of the fabric.

According to another aspect of the invention, there is provided a method of laser etching serial numbers, codes or other information, e.g., sizing, care instructions or ply markings, on the fabric before sewing. Stitching lines, notches and assembly instructions may also be lazed onto the fabric to improve quality control and serve as a guide for sewing.

Other aspects of the invention, including apparatus, devices, systems, processes, and the like that constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIGS. 14A-D illustrate various patterns generated for processing a surface of a fabric according to exemplary embodiments.

DETAILED DESCRIPTION

Figure 1:
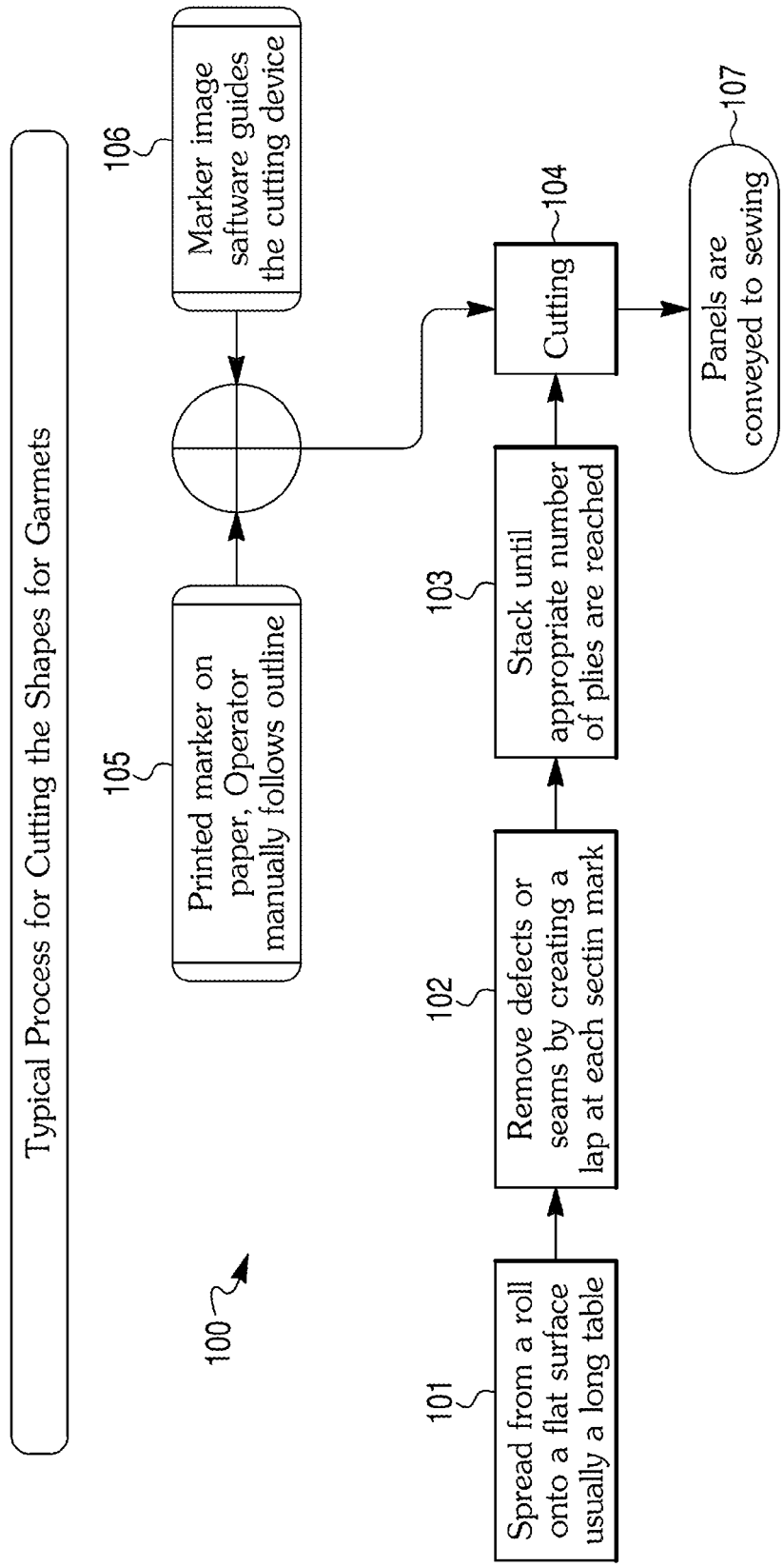
FIG. 1 illustrates a flow chart for cutting and lasing garments according to the prior art.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description.

According to an exemplary embodiment, the method of the invention is used to manufacture garments or other products made of fabric such as denim or twill. The term garment as used herein refers to substantially completed jeans, pants, jackets, dresses, skits, hats, caps, and the like, formed of fabric panels that have been sewn, riveted or glued together. The term product refers to substantially completed bags, totes, purses, pillow covers, and other non-clothing items formed of fabric panels that have been sewn, riveted or glued together. The term panel refers to pieces required for making a garment or product as depicted on a pattern marker or pieces of fabric that have been cut from fabric. The term pattern marker refers to a pattern layout for a garment or product, typically drawn on paper, and laid over one or more layers (plies) of fabric and used as a guide for manual or automated cutting.

Laser cutting refers to the process of cutting panels using laser beams and replaces the process of manual or automated cutting with a pattern marker. The need for a paper pattern marker is eliminated with laser cutting, because the pattern and shape information is incorporated into the software that guides the laser beam. According to an exemplary embodiment, the panel shapes and the etching and/or abrading designs are incorporated into the same software application using a computer-aided design program, such as ADOBE® Photoshop or other suitable program.

Ply marking refer to markings on each panel in a stack of panels to insure that all the pieces of a garment or product come from certain fabric plies. According to an exemplary embodiment, ply markings may all be lased over the back of the fabric or may be lased in a particular location on the front or back of each shaped panel. Such markings ensure uniformity of shade, pattern, etc. for quality control. Ply marking preferably is done during the laser scribing process, eliminating the need for a separate ply-marking step.

Serialization codes refer to numbers or scan codes that give each garment or product an identification unique to a particular piece. Serialization numbers specific to individual garments or products are used to control inventory and combat counterfeit or unauthorized sale of branded articles. According to an exemplary embodiment, the serialization codes can be laser etched onto the fabric making them difficult to alter and thereby eliminating the need to print serialized labels and sew them into the garment or product. Additional information, such as size, style and care instructions can also be laser scribed onto the fabric before sewing, which eliminates the need for printing and affixing labels after the garment or product is assembled. Care labeling is simplified and more accurate according to the present invention. Stitch lines and assembly instructions can also be laser etched onto the fabric to help sewing operators follow the proper assembly process. Similarly, notch markers can be lazed onto the fabric to help align the different panels together for sewing.

Laser scribing refers to the process of marking fabrics with a laser beam. Indigo dyed fabrics, such as denim, which have yarns that are dyed on the outside with a white core on the inside, are particularly responsive to laser scribing to create lines, patterns, designs or fade patterns. While indigo is disclosed, those skilled in the art will appreciate that denim and other fabrics useful with the invention can be dyed with other colors as desired by the manufacturer.

Laser abrasion refers to the process of laser scribing, wherein a laser beam is passed over the fabric to simulate the overall look of a garment or product that has been worn over time and formed wear patterns. This effect may also be achieved or enhanced by hand sanding and/or laundering. Typically this is done on finished garments or products. In an exemplary embodiment, the fabric may optionally be hand sanded, before or after the panels are cut for an enhanced aesthetic look.

Hand, blast, chemical, or robotic abrasion refers to a processes of creating worn looks in localized areas on garments or products by using various abrasive methods or chemicals to destroy the fabric dye, i.e., potassium permanganate spray.

According to an exemplary embodiment, fabric is spread across a relatively flat surface into fabric lengths (spreads) for cutting into shaped panels for garment or product assembly. Spread refers to lengths of fabric that are placed on a table for cutting. These typically contain several layers or plies, which may have anywhere from 1 to about 100 plies, preferably about 20 to 50 plies. Spreading is the act of laying out the fabric.

While spreading the fabric, the fabric preferably is irradiated with at least one laser to (i) apply ply markings at certain points within each fabric panel for various features, such as shade or pattern control; (ii) apply labeling information onto the fabric at certain points, such information could include serial numbers, care instructions, sizing information, brand names, and the like; and/or (iii) abrade the fabric to achieve a desired aesthetic look, such as a vintage look or stonewashed look. In an exemplary embodiment, a laser may also be used to cut the fabric into pre-determined design patterns to create shaped fabric panels suitable for subsequent assembly into a garment or product. The laser is preferably controlled by software that drives the laser to scribe and abrade the fabric, and coordinates the spreading and cutting of the fabric.

As seen in FIG. 1, according to a conventional method 100, fabric is spread from a fabric roll onto a flat surface 101, defects or seams are removed by creating a lap at each spread 102, the spreads are stacked until an appropriate number of plies are reached 103 for cutting at 104. Then, a paper marker is printed or otherwise applied and the plies are cut manually at 105 or, alternatively, marker image software guides a cutting device 106, and the cut panels are conveyed to sewing at step 107.

According to an exemplary embodiment, during spreading, the fabric is passed under at least one laser where the pattern, the serial numbers and/or labels, and the panel abrasion patterns are scribed onto the fabric before cutting. The fabric is then cut into fabric lengths at the end of each spread. These cut fabric lengths are preferably stacked several plies high and aligned for cutting of the shaped panels. Cutting of the shaped panels can be done with a conventional knife system or a laser. In an exemplary embodiment, the pattern marker only is applied to the top ply, but may also be etched on each ply to confirm alignment of the shaped panels.

According to an exemplary embodiment, software driving the cutting layout and software driving the etching or laser abrading of the fabric is coordinated so the matchup of the panels for assembly is exact.

Figure 6:
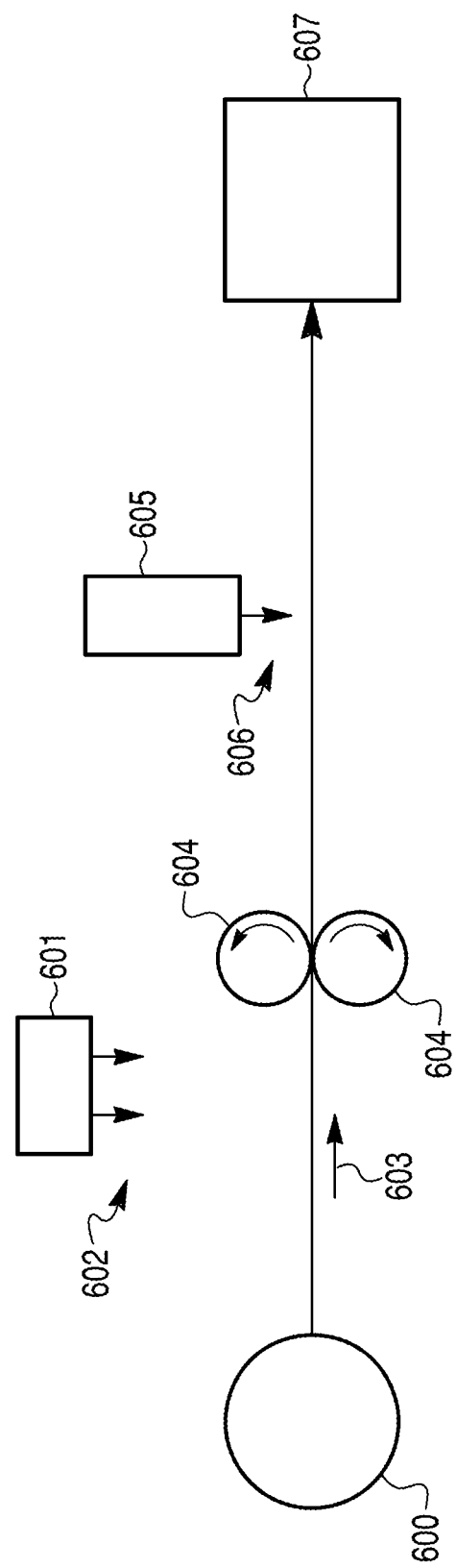
FIG. 6 illustrates a diagram of an exemplary continuous processing system of laser abrading, scribing and cutting garments according to an exemplary embodiment.

As would be evident to one of skill in the art, according to the invention, cutting of the shaped panels may be made during the abrasion process, before the abrasion process or after the abrasion process. In the exemplary embodiment shown in FIG. 6, fabric can be fed onto a flat surface, such as a table, from a fabric roll 600 using feed rolls 604 in a direction 603 away from the roll 600. As the fabric is conveyed on the flat surface, it passed under a laser system 601 and is irradiated with a laser beam 602, which scribes and abrades the panels. The fabric is then conveyed to a cutting device 605 and cutting tool 606 cuts the fabric into panels and conveys them to sewing 607. Alternatively, the fabric may be stacked multi-ply high before the cutting step at 605, in which case the cutting tool 606 cuts the multi-ply panels before conveying to sewing 607. The cut panels may also be stacked prior to conveying to sewing 607. Those skilled in the art will appreciate that the rolls 600 frequently have a width of 60 to 80 inches or more. While we prefer that the fabric rolls be cut prior to lazing, those skilled in the art will recognize that the fabric could be lazed as it is moving along a table in an on-the-fly manner.

Figure 7:
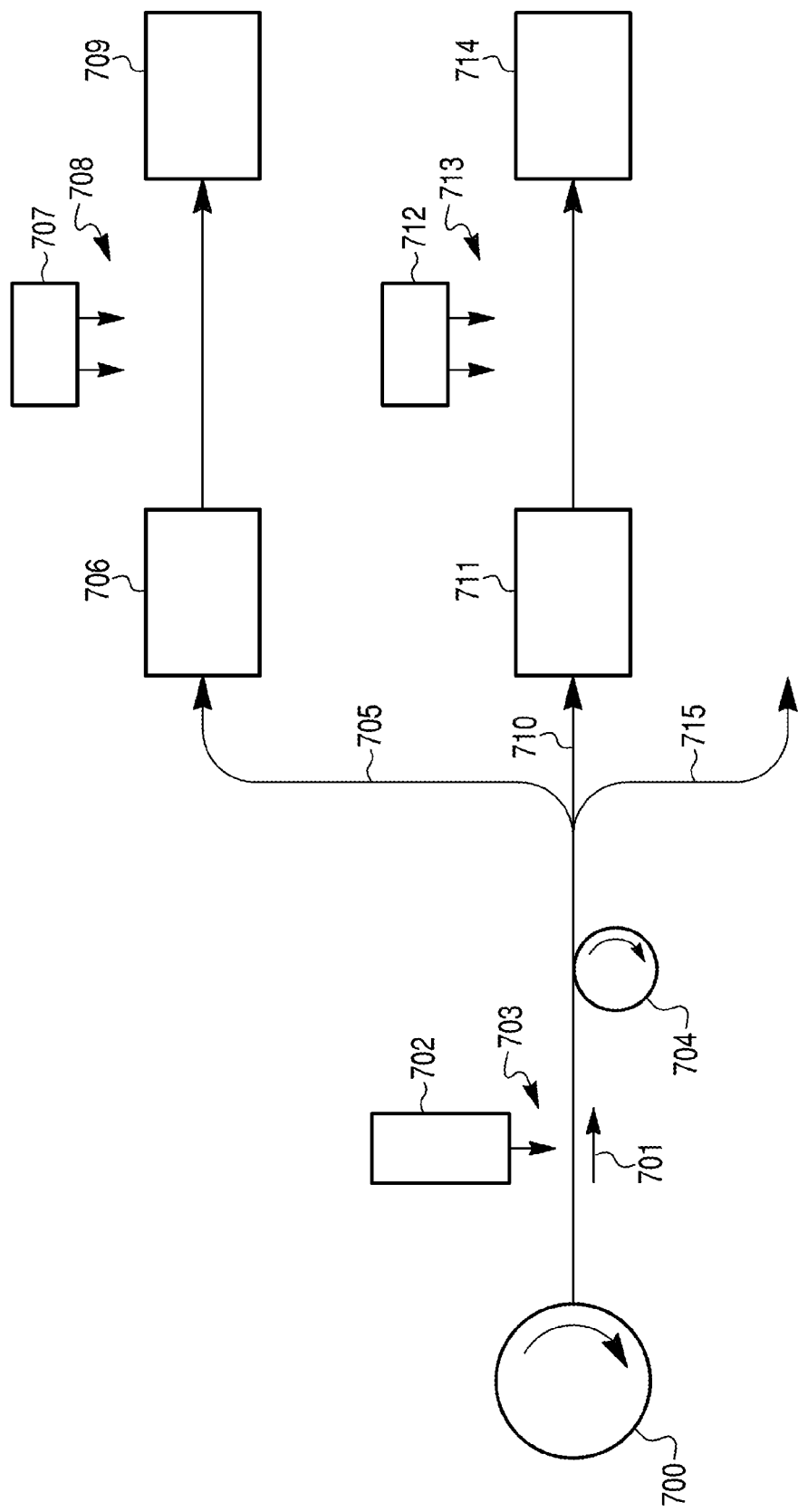
FIG. 7 illustrates a diagram of another exemplary continuous processing system of laser abrading, scribing and cutting garments according to an exemplary embodiment.

Alternatively, the fabric may be cut before being lazed as shown FIG. 7. Specifically, fabric is unrolled from a roll 700 along a flat surface in a direction 701 away from the roll 700 with the aid of a conveyor 704. A cutting device 702 with a cutting tool 703 cuts the fabric into panels. Subsequently, the various panels such as the leg panel, pocket panel, waist panel, etc. are sorted by cut pattern 705, 710, 715 respectively, and stacked multi-ply high 706, 711. Once stacked, the panels are individually fed under a laser system 707, 712, irradiated with a laser beam 708, 713 to scribe and abrade the panels, and conveyed to sewing 709, 714 for assembly into a garment or other product. Optionally, the lazed panels may be stacked multi-ply high before conveying to sewing 709, 714

Figure 8:
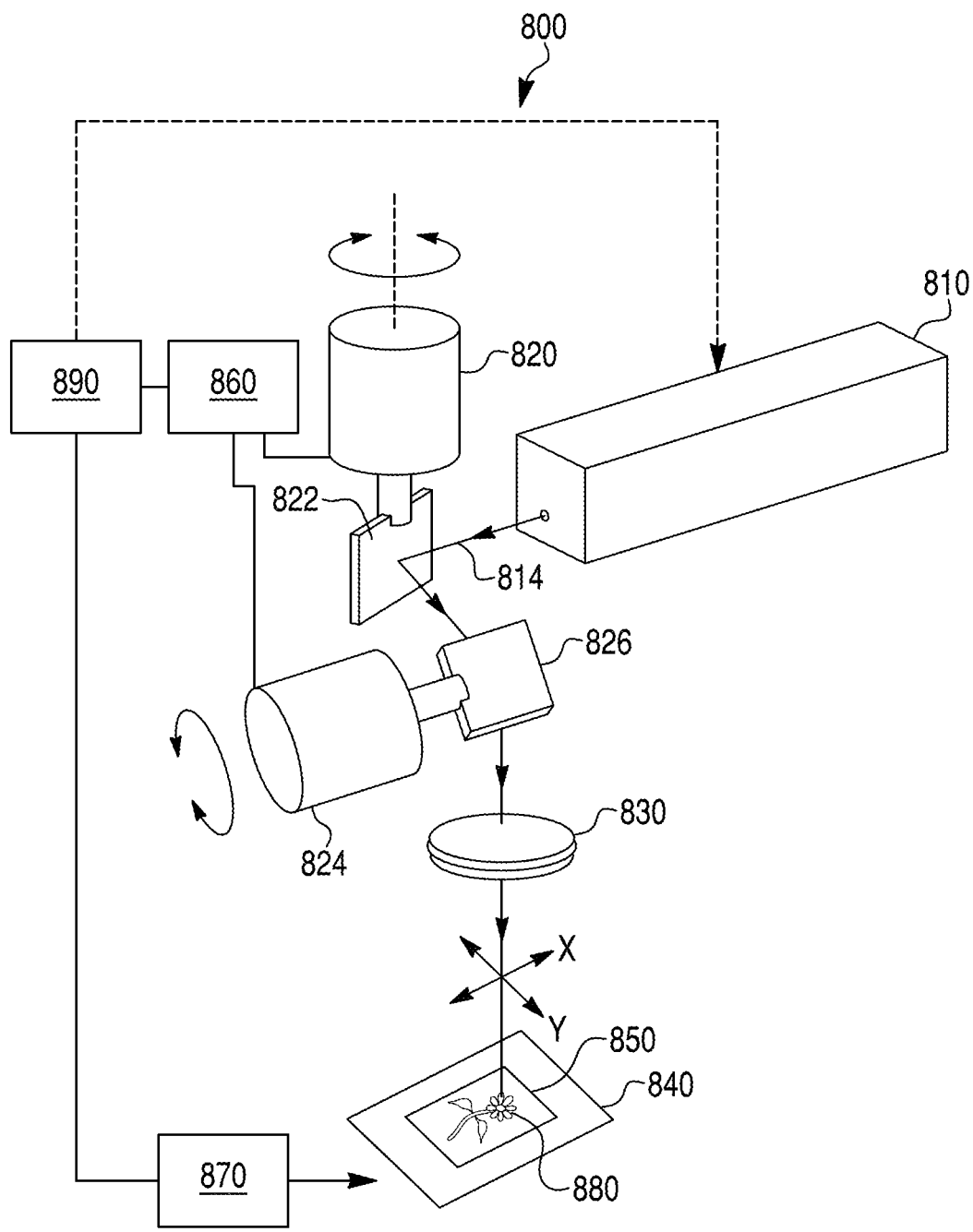
FIG. 8 illustrates an exemplary laser system for processing a surface of a fabric according to an exemplary embodiment.

FIG. 8 illustrates an exemplary laser system 800 for processing a surface of a fabric according to an exemplary embodiment of the present invention. FIG. 8 illustrates the pre-objective scanning architecture option where the scanning mirrors 822, 826 are located before the focus or objective lens 830. However, laser system 800 can alternatively include a post-objective scanning architecture where the scanning mirrors 822, 826 are located after the focus or objective lens 830. System 800 includes a laser 810 configured to produce a laser beam having a variable effective applied power level. Laser 810 preferably has an effective power of 2500 to 5000 Watts or more. Laser 810 can be a $CO_2$ laser or a YAG laser. Laser 810 can further include an electrically controllable beam shutter (not illustrated) to turn the beam on and off as desired. A suitable laser and mirror system is available from Lasx Industries of White Bear Lake, Minn.

Laser 810 generates a laser beam 814 in the direction of a beam steering and scanning device having a first scanning mirror 822 and a second scanning mirror 826. The mirror 826 is mounted on a first galvanometer 820 so that the mirror 822 can be rotated to move the beam in an x-axis on the support stage 840. A second galvanometer 824 is used to control the mirror 826 so that the mirror 826 can move the beam on the support stage 840 along a y-axis. In other words, mirrors 822 and 826 can be controlled to scan the laser beam on the support stage 840 to generate any trace or geometric shape associated with the generated pattern to process the surface of the fabric through laser irradiation 880. A galvanometer driver 860 receives commands including numerical control commands from laser control device 890 and respectively controls the movement of each mirror 822, 826.

Laser beam 814 is deflected first by the x-axis mirror 822 and subsequently by the y-axis mirror 826 to direct the beam through a focusing lens 830. The lens 830 is preferably a multi-element, flat-field, focusing lens assembly, which is capable of optically maintaining the focused spot on a flat plane as the laser beam moves across the material. A movable stage (not shown) may be used to hold the lens 830 so that the distance between the lens 830 and the support stage 840 can be changed to alter the beam spot size. Alternatively, the support stage 840 can be moved relative to the lens 830. The support stage 840 has a working surface which can be almost any substrate including a table, or even a gaseous fluidized bed. A work piece 850, e.g., fabric to be processed through laser irradiation, is placed on the working surface. Usually, the laser beam is directed generally perpendicular to the surface of the support stage 840, but it may be desirable to guide the beam to the surface with an angle to achieve certain effects. For example, the incident angle may range between about 45° and about 135°.

The system 800 may also include a gas tank 870 to supply a gas, such as an inert gas or coloring gas, into the working zone over the support stage 840. The amount of gas can be controlled by laser control device 890. This use of inert gas may reduce the tendency for complete carbonization, burn-through and/or melting at the surface of the fabric during processing. The gas tank 870 can also be used to supply a gaseous dye to add additional or alternative coloring to the work piece.

In an exemplary embodiment, the shaped panels are cut with a low power laser for accuracy and labeled to insure panels are properly assembled for sewing. In this case, the labeling may preferably be a bar code for easy identification, data entry and quality control.

Figure 9:
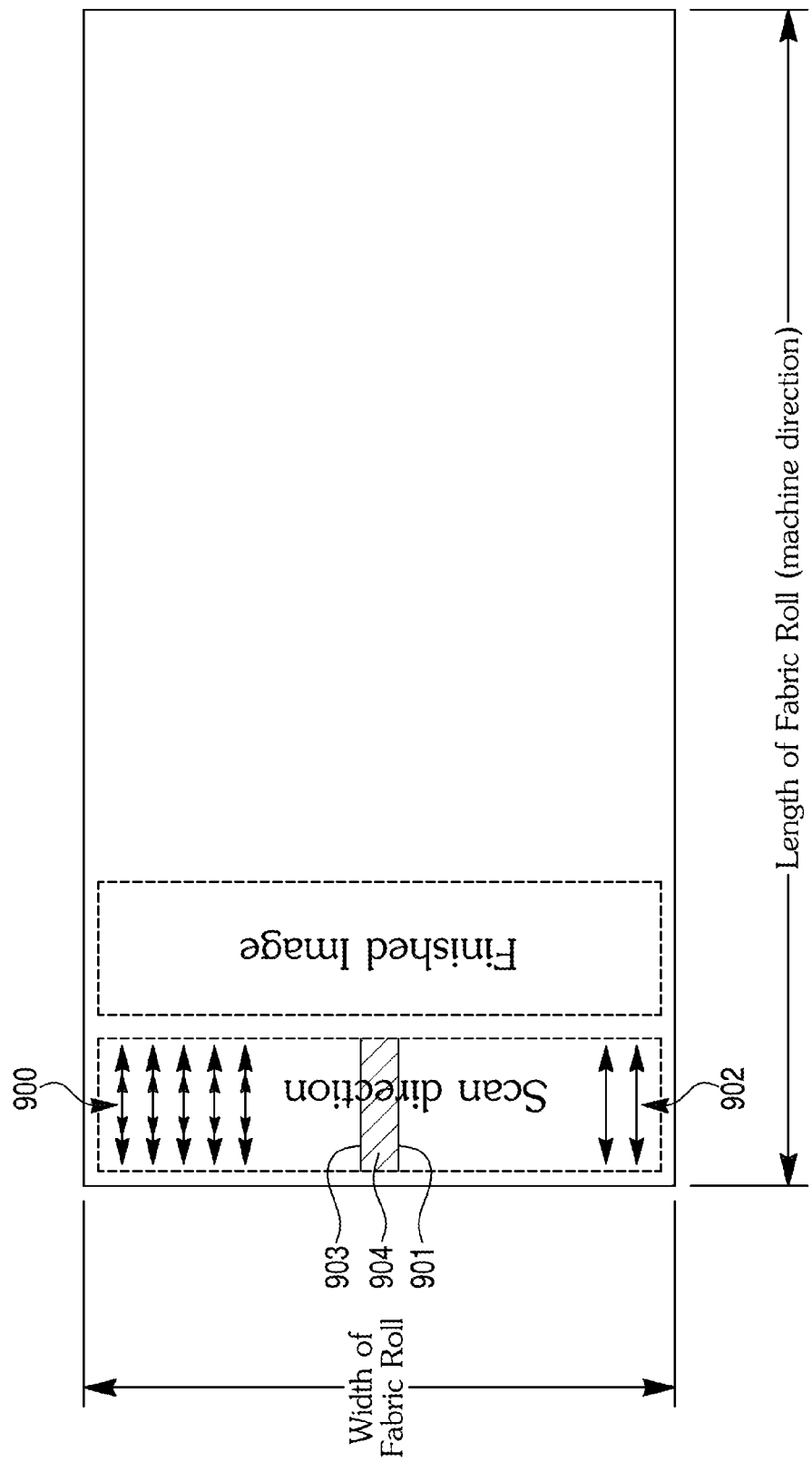
FIG. 9 illustrates an exemplary method of lazing an image on a surface of a fabric according to an exemplary embodiment.
Figure 10:
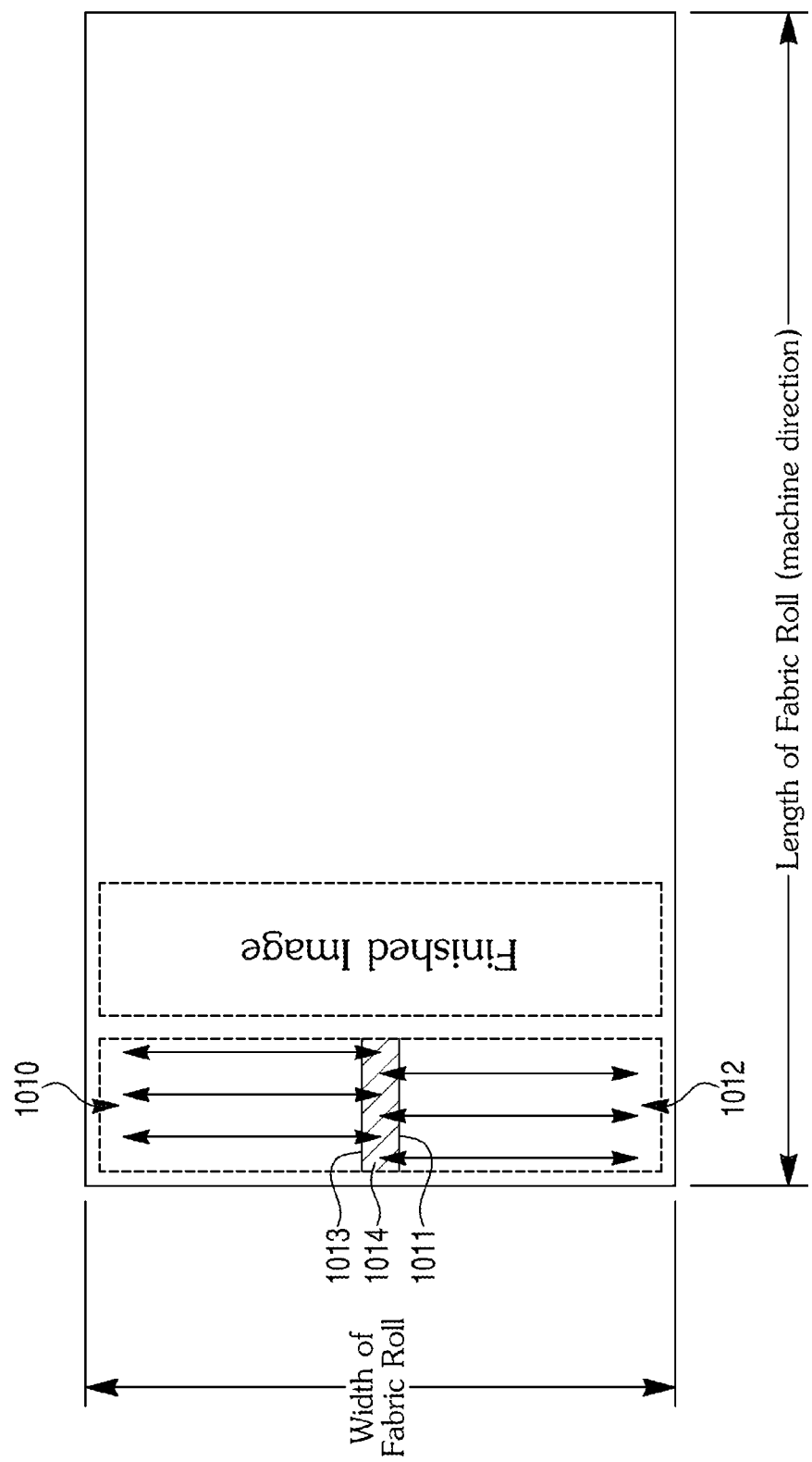
FIG. 10 illustrates an exemplary method of lazing an image on a surface of a fabric according to another exemplary embodiment.

In an exemplary embodiment, as best illustrated in FIGS. 9 and 10, a fabric roll is processed to create a pattern on the surface of the fabric where the pattern is created using scan lines applied in the either the length direction of the fabric 900, 902 or the width direction of the fabric 1010, 1012. The scan lines can be applied to the fabric within a pattern area and the image can be lazed in either a continuous linear fashion or by indexing. The pattern area can be defined to have a width corresponding to a width of the fabric roll. In addition, the length of the pattern area can be selected to be any dimension. For example, when the fabric roll has a width of 60 inches, a pattern can be created to have an area that is 60 inches wide (e.g., corresponds to the entire width of the roll) and 6 inches in length where the pattern is then repeated every 6 inches along the length of the fabric roll. While 6 inches is used as an exemplary length dimension of the pattern area, one of ordinary skill in the art would recognize that any length can be selected. Further, while the laser scribing is repeated every six (6) inches, the individual scan lines may be more or less than that length in order to minimize the creation of a line of demarcation that may occur if all scan lines are the same length. U.S. Pat. No. 8,460,566, incorporated herein by reference, discloses a method of staggering laser lines in order to eliminate the demarcation line and may be utilized in the invention. As the laser processes the surface of the fabric to include the pattern, the laser beam is scanned along the length of the fabric (e.g., each scan line corresponds to the 6 inches dimension of the pattern area) as the laser beam head is translated across the width of the fabric roll. After the image corresponding to the pattern is created within the 60×6 area of the roll, the next pattern area is created in the surface of the fabric roll adjacent to the previously processed area. It is noted that the pattern area is illustrated in FIGS. 9 and 10 to be slightly less than the width of the roll and spaces between images are created in the fabric for clarity and ease of illustration. However, preferably, the pattern areas are juxtaposed, one pattern area directly adjacent to another, such that adjacent pattern areas do not overlap on the surface of the fabric. In addition, it is further preferred that the pattern area is equal to the width of the fabric roll rather than slightly less as illustrated in FIGS. 9 and 10. The dimensions of the pattern area and drawing direction on the fabric roll can change depending upon the type of graphic and size of the fabric roll. For example, while the scanning direction is described as occurring in the length direction of the fabric roll, the scanning direction may alternatively be in the width direction, or performed on the bias (e.g., in a diagonal direction) of the fabric.

Figure 11:
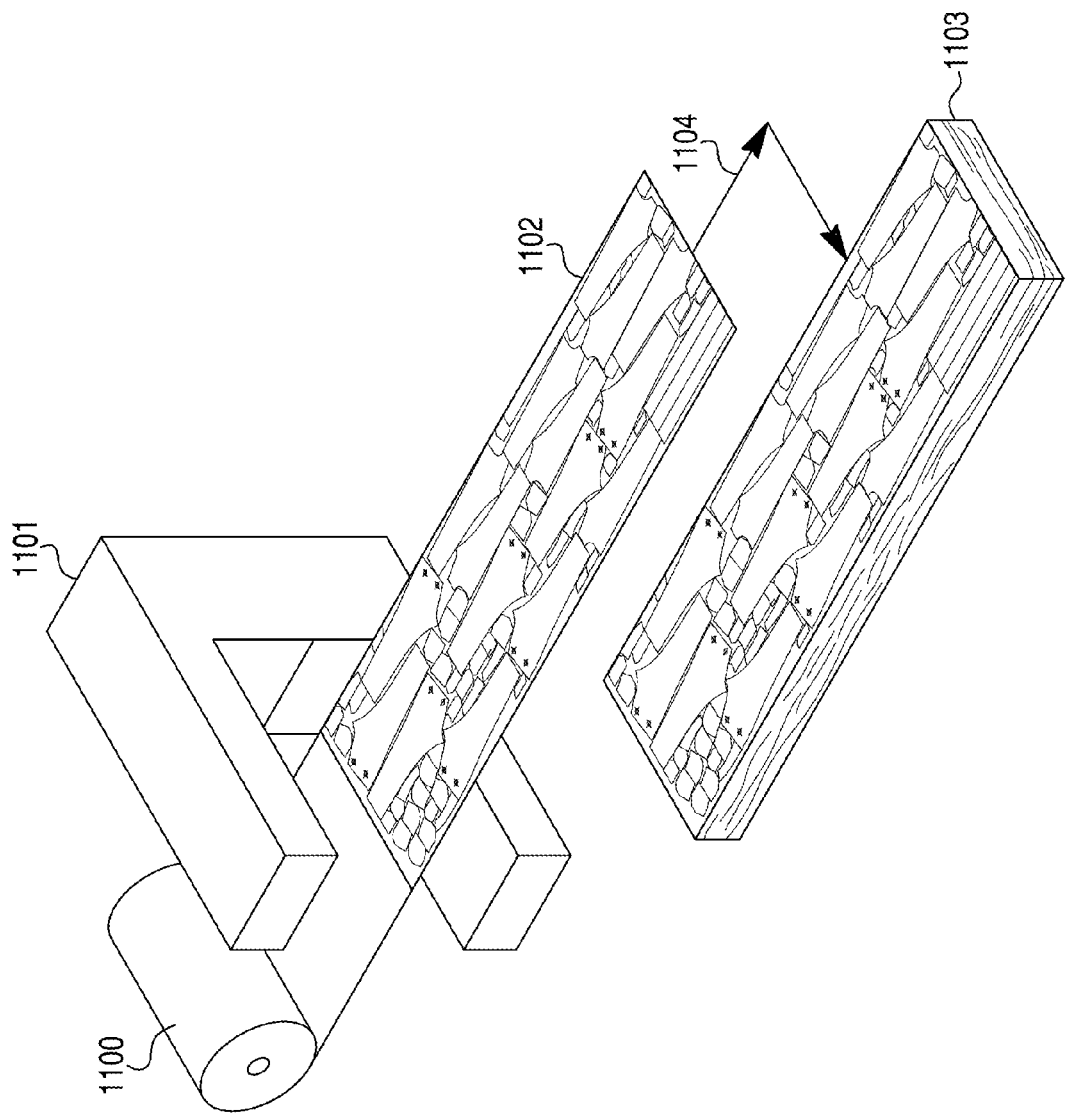
FIG. 11 illustrates a system for processing a surface of a fabric according to an exemplary embodiment.
Figure 12:
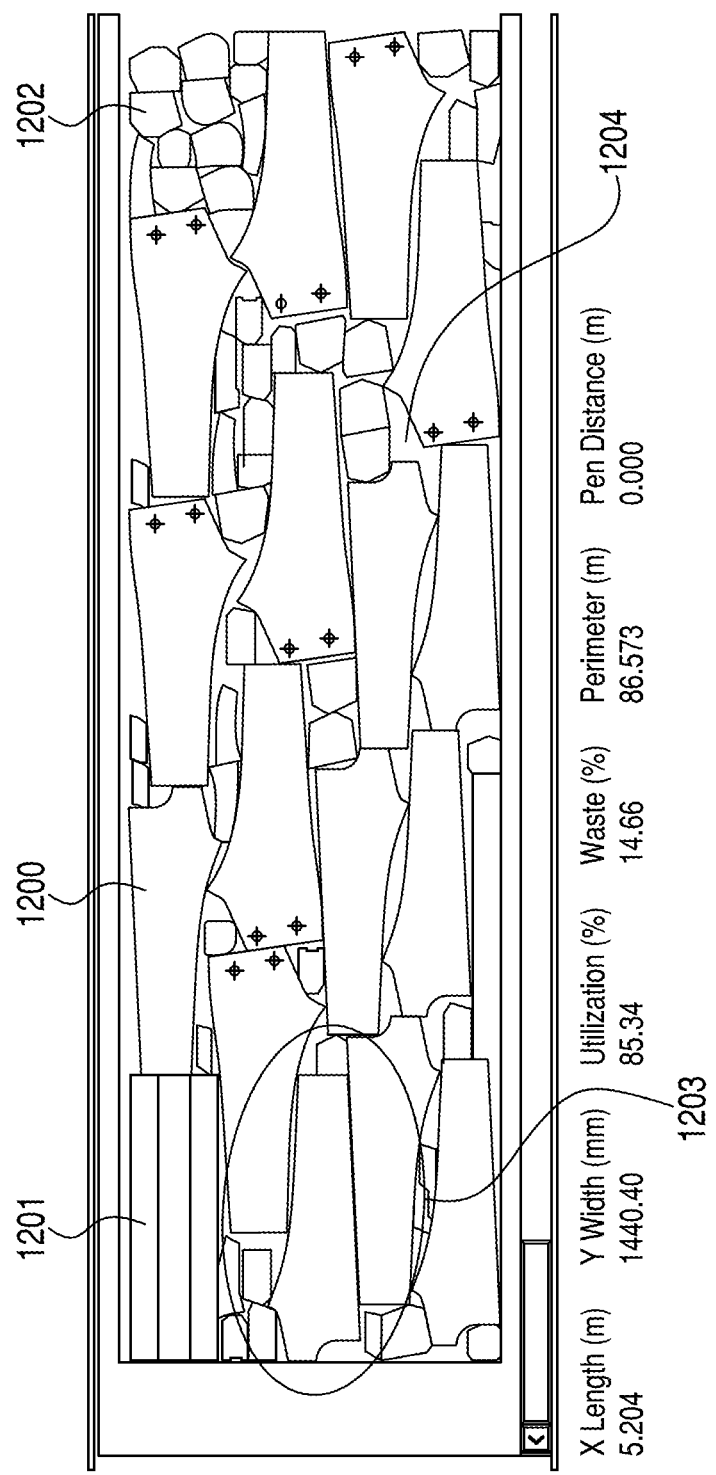
FIG. 12 illustrates exemplary markers used in an exemplary method of manufacturing a garment according to an exemplary embodiment.

According to a preferred embodiment, at, least two lasers scanning in the same direction, i.e., 900 and 902 or 1010 and 1012 are used. For example, one laser may scan in a direction 900 up to, boundary 901 and another laser may scan in a direction 902 up to a boundary 903 such as to create an overlapping scanning area 904. Similarly, one laser may scan in a direction 1010 up to boundary 1011 and another laser may scan in a direction 1012 up to a boundary 1013 such as to create an overlapping scanning area. When using multiple lasers, it is preferred that each laser scan a defined percentage of the roll. When using two lasers, for example, each scans halfway across the roll. In that event, it is preferred that each laser scribe half the width of the roll. As illustrated in FIGS. 11-12, the individual panels are not necessarily aligned at the midpoint of the fabric. In that event, it is preferred that each laser scribe a complete panel in order to minimize image irregularities as could occur due to fabric stretching, fabric mislocation, laser misalignment, etc.

In an exemplary embodiment, a laser abrades the panel areas and scribes the labels before the shaped panels are cut. The abrasion design software comprises a menu to allow selection of an abrasion pattern for each fabric panel, i.e., front panel, back panel, pocket, etc., as necessary, as well as each area of the panel requiring abrading or not requiring it, i.e., knee area, pocket area, etc. Depending upon the aesthetic look desired, some panels may not be abraded and some portions of some panels may not be abraded. According to the invention, the abrasion patterns are divided into elements. For example in a jean, the pockets would be abraded as a panel and the location where the pocket would be sewn onto the jean would not have any abrasion at all. Waist band, watch pocket, pocket facing, back rise, fly, etc. and the underlying fabric panel would all be abraded in like manner. Minimizing the areas to be abraded may speed the abrading process.

Figure 2:
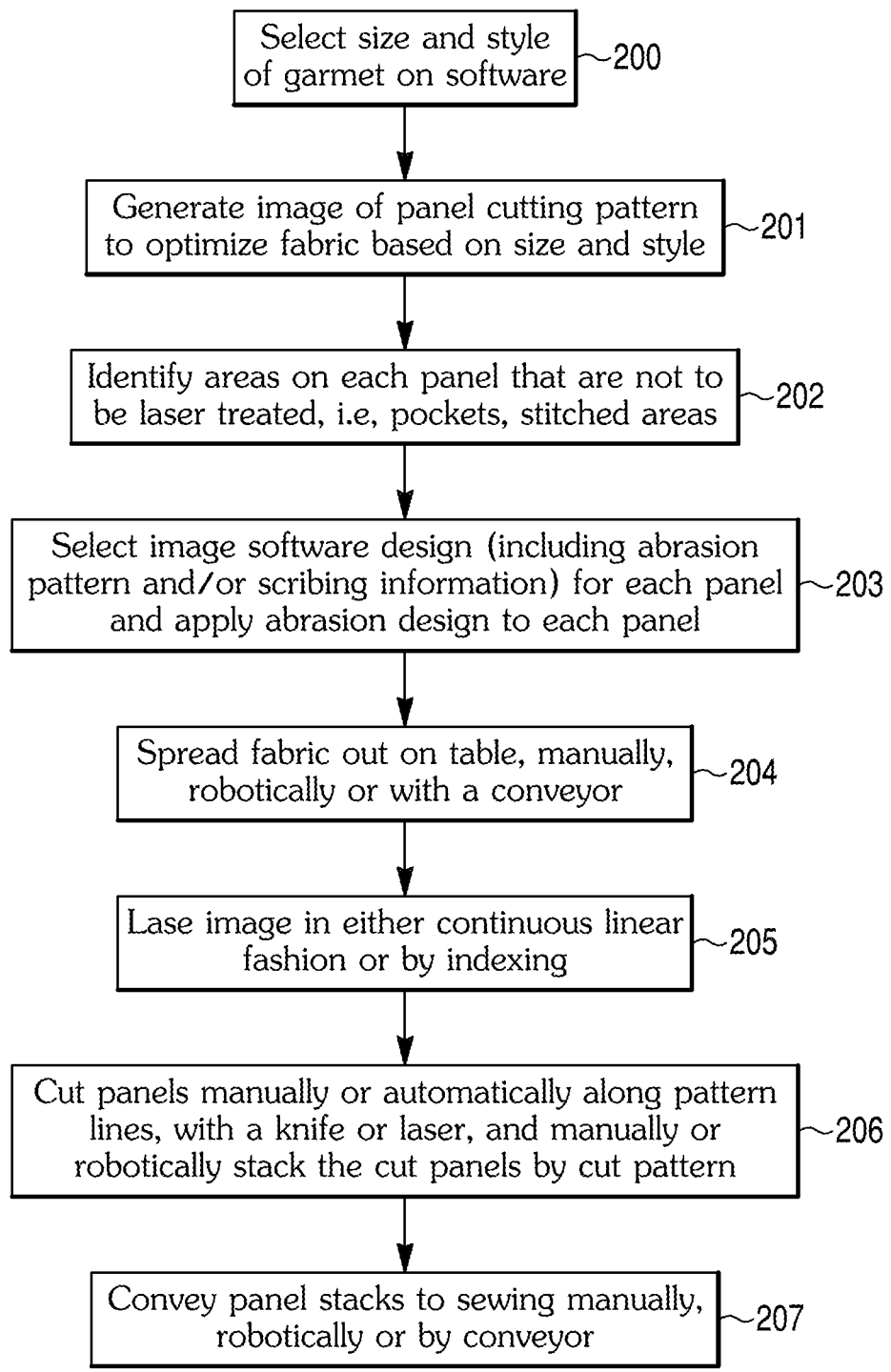
FIG. 2 illustrates a flow chart of an exemplary single ply method of laser abrading, scribing and cutting garments according to an exemplary embodiment.

In an exemplary embodiment for single ply processing, the system as seen in FIG. 2 includes the following steps:

i) loading the panel abrasion software, pattern marker software, and fabric scribing software (not shown);

ii) selecting the size and style of garment in the software at 200;

iii) generating the image of a panel cutting pattern with the software to optimize usage of the fabric based on size and style at 201;

iv) identifying areas on each panel that are not to be laser treated such as the pockets or the margins of each panel to allow for sewing at 202;

v) selecting the image software design, including the abrasion patterns and/or the scribing information for each panel at 203;

vi) spreading a roll of fabric on a flat surface under at least one laser at 204;

vii) laser scribing ply numbers, serial numbers, labels, fabric markers, and panel abrasions on the fabric at 205;

viii) cutting shaped panels along the lines of the pattern marker with a conventional knife, laser, or other appropriate cutting tool at 206; and ix) stacking and conveying the abraded, labeled and shaped panels robotically or manually for sewing at 207.

Figure 3:
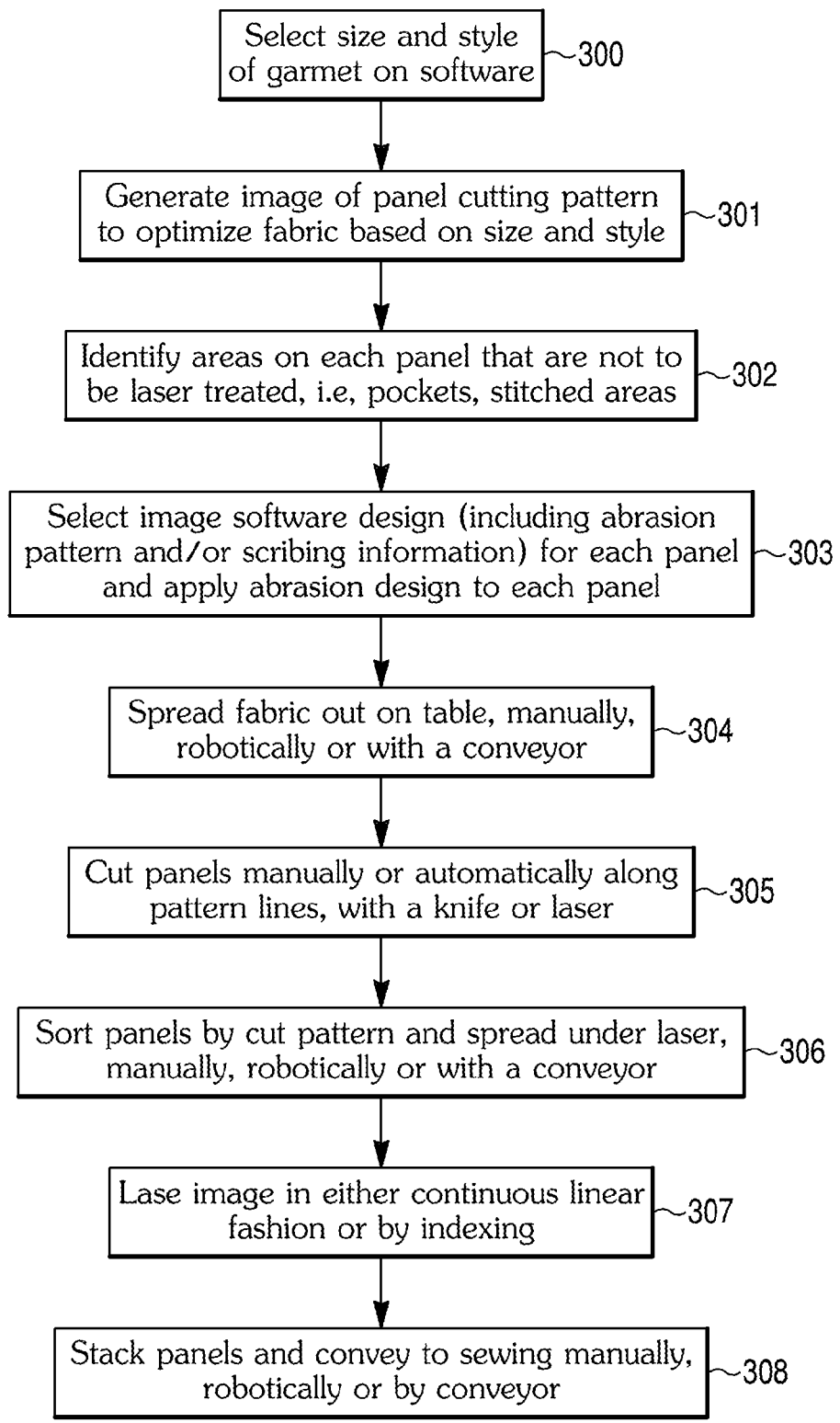
FIG. 3 illustrates a flow chart of another exemplary single ply method of laser abrading, scribing and cutting garments according to an exemplary embodiment.

Alternatively, the fabric may be cut before it is lazed as shown in FIG. 3, wherein the steps include:

i) selecting the size and style of garment in the software at 300;

ii) generating the image of a panel cutting pattern with the software to optimize usage of the fabric based on size and style at 301;

iii) identifying areas on each panel that are not to be laser treated such as the pockets or the margins of each panel to allow for sewing at 302;

iv) selecting the image software design, including the abrasion patterns and/or the scribing information for each panel at 03;

v) placing the fabric on a flat surface at 304;

vi) cutting shaped panels along the lines of the pattern marker with a conventional knife, laser, or other appropriate cutting tool at 305;

vii) sorting the panels by cut pattern and spreading them under a laser at 306;

viii) laser scribing ply numbers, serial numbers, labels, fabric markers, and panel abrasions on the fabric at 307; and ix) stacking and conveying the abraded, labeled and shaped panels robotically or manually for sewing at 308.

Figure 4:
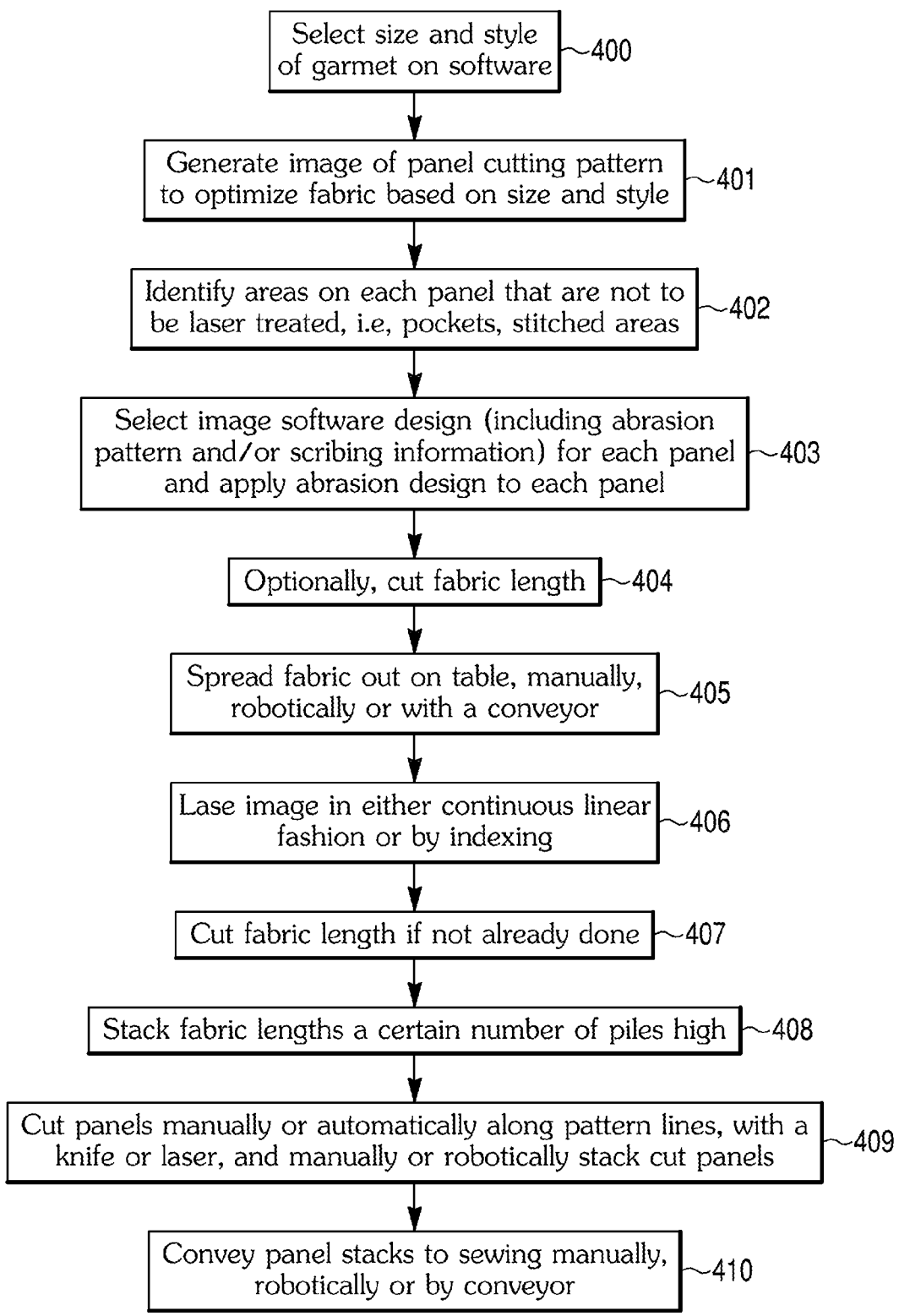
FIG. 4 illustrates a flow chart of an exemplary multi-ply method of laser abrading, scribing and cutting garments according to an exemplary embodiment.

In an exemplary embodiment for multi ply processing, the system as seen in FIG. 4 includes the following steps:

i) loading the panel abrasion software, pattern marker software, and fabric scribing software (not shown);

ii) selecting the size and style of garment in the software at 400;

iii) generating the image of a panel cutting pattern with the software to optimize usage of the fabric based on size and style at 401;

iv) identifying areas on each panel that are not to be laser treated such as the pockets or the margins of each panel to allow for sewing at 402;

v) selecting the image software design, including the abrasion patterns and/or the scribing information for each panel at 403;

vi) optionally, cutting the fabric length at 404;

vii) spreading the fabric on a flat surface under at least one laser at 405;

viii) laser scribing ply numbers, serial numbers, labels, fabric markers, and panel abrasions on the fabric at 406;

ix) cutting the fabric length if not already done so in step vi) at 407;

x) stacking the fabric lengths a certain number of plies high at 408;

xi) cutting shaped panels along the lines of the pattern marker with a conventional knife, laser, or other appropriate cutting tool at 409; and xii) conveying the abraded, labeled and shaped panels robotically or manually for sewing at 410.

Figure 5:
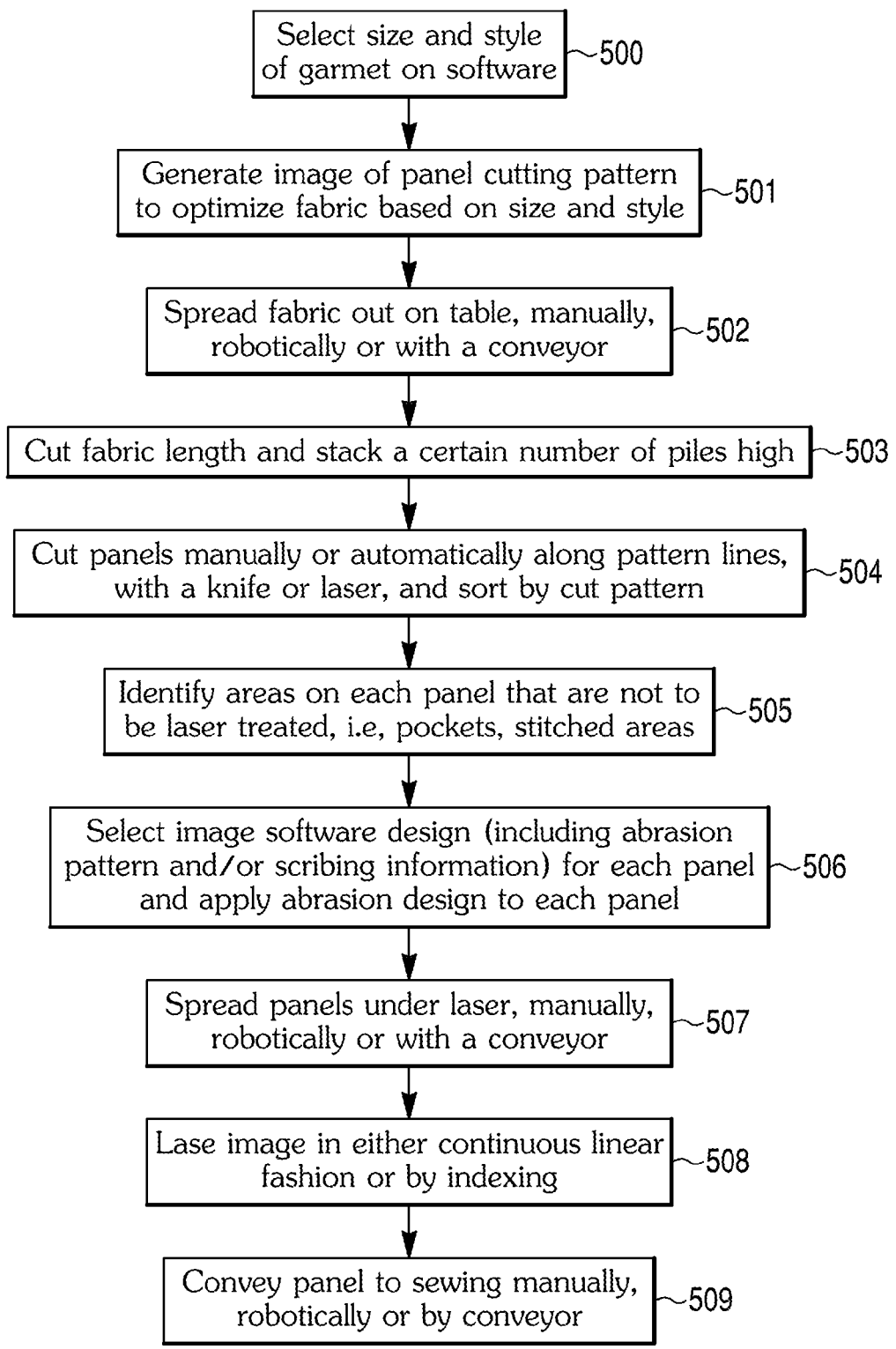
FIG. 5 illustrates a flow chart of another exemplary multi-ply method of laser abrading, scribing and cutting garments according to an exemplary embodiment.

Alternatively, the fabric may be cut before it is lazed as shown in FIG. 5, wherein the steps include:

i) selecting the size and style of garment in the software at 500;

ii) generating the image of a panel cutting pattern with the software to optimize usage of the fabric based on size and style at 501;

iii) spreading the fabric on a flat surface at 502;

iv) cutting the fabric into lengths at 503;

v) cutting shaped panels along the lines of the pattern marker with a conventional knife, laser, or other appropriate cutting tool at 504;

vi) identifying areas on each panel that are not to be laser treated such as the pockets or the margins of each panel to allow for sewing at 505;

vii) selecting the image software design, including the abrasion patterns and/or the scribing information for each panel at 506;

viii) spreading the panels under a laser at 507;

ix) laser scribing ply numbers, serial numbers, labels, fabric markers, and panel abrasions on the fabric at 508; and ix) stacking and conveying the abraded, labeled and shaped panels robotically or manually for sewing at 509.

According to an exemplary embodiment, defects or seams may be removed before the panel patterns are finalized.

The abrasion laser is guided according to the shape and location of each panel as determined by the pattern marker software. Pattern marker software is available from Gerber Technology of Tolland, Conn. Location and content of any required labeling or serialization in the scribing software is also coordinated with the pattern marker software. After a length of fabric has been abraded and scribed, the fabric is cut across the width of the roll. This cutting line may not be a straight line and can conform to the edges of the shaped panels as they appear in the pattern marker. These fabric lengths may be stacked into a conventional spread, and cut manually or automatically. Finally, the cut, labeled, and abraded panels are picked up and stacked robotically or manually a certain number of plies high according to the needs of the sewing line, i.e., progressive bundle system that stacks the cut, abraded and scribed panels into bundles.

According to another exemplary embodiment, a laser also cuts out the shaped panels during the process. In this embodiment, once the shaped panels are cut, they enter a unit sewing system or are stacked robotically to enter a progressing bundle sewing line as is known in the art. The cutting laser either cuts through the fabric at the edge of the abraded panel or if there is no abrasion at the panel edge, where the panel edge is based on the pattern marker depending on the particular abrasion pattern. The laser cutting sequence is also optimized for speed and efficiency. Therefore, according to the invention, the fabric for a given panel may be cut before, during, or after the abrasion of that panel. Both the abrasion software and the scribing software are integrated with the marker software for the edge location of each panel that makes up the garment or product after sewing. The cut, labeled, and abraded panels are to be picked up and stacked a certain number of plies high according to the needs of the sewing line (progressive bundle system). In an exemplary embodiment, both sides of the fabric may be laser treated, wherein one side may be abraded and the other side scribed. In this case, the fabric is first spread under the laser, abraded on one side, the fabric length is cut, the fabric is flipped over, the other side is scribed, the fabric lengths are stacked, cut into panels and the panels are then stacked for sewing. Of course, as would be evident to one of skill in the art, the first side may be scribed and then the fabric flipped for abrading on the second side.

The pattern marker software is programmed with the various panel shapes for size, i.e., waist and length, as well as style, i.e., skinny leg, straight leg, boot cut, etc., and allows margins for sewing, i.e., seams and fabric folds. The pattern marker software includes all the pieces that make up a garment or product in several different combinations of sizes/styles.

Preferably, with garments, the same file is used for a range of up to 3 or more sizes. For example, file A might be used for sizes 0-2, file B might be used for sizes 3-5, etc. The software patterns may also be changed, for example to change the length of the image, the width of the image and/or certain dimensions within the image. For example, the size of certain whiskers or a section of the abrading to fit certain sizes.

FIG. 11 illustrates laser scribing on a roll 1100 and creating a series of patterns on the fabric 1102 combining the laser scribed images with the marker image with the aid of a laser system 1101. In this multi-ply embodiment, the marker pattern may be printed on a piece of paper and then semi attached to the top layer of the multi-ply spread with adhesive or staples. In this embodiment, only the top layer is lazed, as the other layers are conveyed 1104 to be stacked a certain number of plies high 1103, with care being taken to line them up correctly for subsequent cutting.

Alternatively, a single ply can be cut using a cutting device driven by the same software. The laser scribing and abrading may be done by at least one laser, but preferably at least two: one for abrading and scribing and one for cutting. According to yet another alternative, the panel patterns may be cut out first, and then the panels are fed under the laser.

The integrated software is optimized to minimize fabric waste and maximize output. An exemplary layout is illustrated in FIG. 12, wherein leg panels 1200, waist bands 1201 and pocket panels 1202 are arranged to minimize waste 1204. As seen in FIG. 12, the panel shapes are manipulated in order to nest them to optimize yield and reduce waste. The software is programmed to decide which function to give the laser next, based on the end point of the last function. If there is more than one laser for the abrading, scribing and cutting, the power level, distance, and speed to move to the next firing point is part of the software program as well in order to maintain maximum firing timing and optimum speed for the system. If the size or style changes, then the system utilizes different patterns or combines sizes and styles within a bundle. Each panel shape is a customized image related to the size and style of the garment or product 1204.

Figure 13:
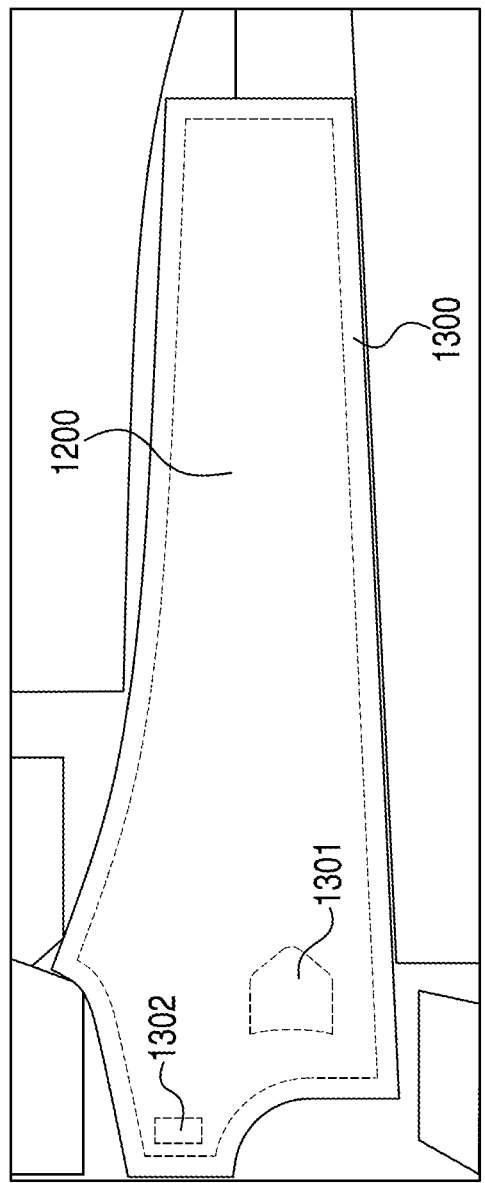
FIG. 13 illustrates an enlarged view of a portion of FIG. 12.

As seen in FIG. 13, which is an enlarged view of area 1203, leg panel 1200 has areas that are not laser treated such as the pocket area 1301, the seam area 1300 and the product information area 1302. Once the pattern software has optimized the individual panels to accommodate the size of the fabric, an operator then identifies each panel, selects the abrasion pattern to be applied to each panel, and scales the pattern to the area to be lazed. While this may be done by an operator, those skilled in the art will recognize that the process may also be implemented through software.

A laser for abrading and/or etching is well known to one of skill in the art. A cutter for a single ply is also well known in the art. In an exemplary embodiment, at least one laser is built into a gantry above the fabric or mounted so that a gimbal mirror can aim the laser beam so that the cutting beam can be manipulated around the edges of the shaped panel.

At least one laser needs to laze within the edges of the patterns and apply any necessary labeling at the same time. The abrasion and/or scribing can be done before, during, or after the panel cutting. Ideally more than one set of cutting lasers are employed and more than one set of abrasion/scribing lasers are employed in order to maximize speed, although the invention also contemplates using only one laser for all three functions. For efficiency, whether one laser or multiple lasers are used, they would have very low pause times when they are not firing.

According to an exemplary embodiment, the fabric is spread flat on a conveying surface for laser treatment and cutting. Alternatively, the laser can be moved linearly above the fabric spread below on a table. In either case, the table that could be as long as about 80 ft and as wide as the roll of fabric. In an exemplary embodiment, the system also comprises a stacking device for a progressive bundle system. In any case, as the fabric is a known distance from the laser source, the accuracy and resolution of the designs, patterns and images is improved as compared to lasing a finished garment or product. Other advantages are that the laser can treat evenly all areas of the roll or panels. With finished garments, some areas may have creases, the garment may not lie flat or have areas inside the crotch that are difficult to properly treat. Further, preassembly lasing allows proper treatment of areas that would be hidden in a finished garment, such as inside front and back pockets for a regular 5-pocket jean. Another advantage of the invention is that it reduces the overall cut and dry process footprint. Further, the invention eliminates an entire step from the manufacturing process. Once the panel pieces have been sewn into a garment, the garment may proceed directly to be laundered.

In an exemplary embodiment, the panel areas may also be continuously abraded, then stacked and aligned in fabric lengths and cut in a conventional manner.

Example—Stonewashed Jean with Whisker Abrasions

Marking numbers or other information may be lazed onto a leg panel 1200, 1400 in different locations as shown on FIGS. 13 and 14A at 1302 or at 1401. As seen in FIG. 14C, each panel is abraded with a stonewashed pattern 1404 to the point of the seam location and only in those areas that are exposed, e.g., not under the pockets. In this example, about 25% of each fabric length is not laser abraded, leaving a margin 1405, 1300 that is not abraded as seen in FIGS. 13 and 14D. The whisker abrasions 1402, 1403 are overlaid on top of the stonewashed pattern in the appropriate areas on the panel as seen in FIG. 14B. The overlaid images are combined to create a single image with elements for cutting as seen in FIG. 14D, which shows the marker shape and seam allowance 1300, 1405. Therefore, this example has three (3) layered images that form the complete shaped panel:
- the master is the panel shape;
- the stonewashed abrasion image that is applied appropriately within the boundaries of the panel shape; and
- the whisker abrasion images that are also applied appropriately within the boundaries of the panel shape.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. A method of generating a design on a surface of a fabric with laser irradiation, comprising the steps of:
   providing a laser system comprising software programmed with a plurality of designs based on a plurality of garment sizes and a plurality of garment styles, each different combination of garment size and garment style being associated with a respective plurality of panel shapes that are configured for assembly with one another into a respective garment, wherein the designs of the different combinations of garment size and garment style programmed in the software differ from one another;
   selecting a design from the plurality of designs;
   selecting a garment size and a garment style from the plurality of garment sizes and the plurality of garment styles; and controlling the laser system with the software and laser abrading and/or laser etching the selected design on areas of a fabric corresponding to the respective plurality of panel shapes of the combination of the selected garment size and the selected garment style prior to assembly of the respective plurality of panel shapes into the garment.

2. The method of claim 1, wherein the designs comprise abrasion patterns.

3. The method of claim 1, wherein each of the garment sizes comprises a range of garment sizes.

4. The method of claim 1, wherein the design simulates an appearance of stone washing.

5. The method of claim 1, further comprising the step of controlling the laser system with the software to laser scribe wash and care instructions, serialization codes, size information, style information, or a combination thereof.

6. The method of claim 1, further comprising the step of cutting the fabric, wherein said abrading and/or laser etching is performed prior to said cutting of the fabric.

7. The method of claim 1, further comprising the step of cutting the fabric, wherein said laser abrading and/or laser etching is performed after said cutting of the fabric.

8. The method of claim 1, wherein the garment size comprises waist and length information and wherein the garment style comprises leg cut type information.

9. The method of claim 1, including the step of selecting denim as the fabric.

10. The method of claim 1, wherein the software comprises panel abrasion software, pattern marker software, and fabric scribing software.

11. The method of claim 1, further comprising laser scribing ply numbers, serial numbers, labels, fabric markers, panel abrasions, or a combination thereof on the fabric.

12. The method of claim 1, further comprising laser cutting the fabric, while the fabric is in an un-stacked state, with the laser system into the plurality of panel shapes.

13. A method of generating a design on a surface of a fabric with laser irradiation, comprising the steps of:
providing a laser system comprising software programmed with a plurality of designs based on a plurality of garment sizes and a plurality of garment styles, each different combination of garment size and garment style being associated with a respective plurality of panel shapes that are configured for assembly with one another into a respective garment, wherein the designs of the different combinations of garment size and garment style programmed in the software differ from one another;
selecting a design from the plurality of designs;
selecting a garment size and a garment style from the plurality of garment sizes and the plurality of garment styles; and
controlling the laser system with the software and laser abrading and/or laser etching the selected design on areas of a fabric corresponding to the respective plurality of panel shapes of the combination of the selected garment size and the selected garment style prior to assembly of the respective plurality of panel shapes into the garment,
wherein said controlling the laser system with the software and laser abrading and/or laser etching comprises not laser abrading and/or laser etching margins within and along edges of the panels.

14. A method of generating a design on a surface of a fabric with laser irradiation, comprising the steps of:
laser scribing and/or laser abrading a fabric with a laser system to form a design on the fabric; and
laser cutting the fabric with the laser system, while the fabric is in an un-stacked state, to provide shaped panels configured for assembly with one another into a garment,
wherein the laser system comprises software programmed with a plurality of designs, a plurality of garment sizes, and a plurality of garment styles, each different combination of garment size and garment style being associated with a respective plurality of panel shapes configured for assembly with one another into a respective garment.

15. The method of claim 14, further comprising:
selecting the design from the plurality of designs;
selecting a garment size from the plurality of garment sizes; and
selecting a garment style from the plurality of garment styles.

16. The method of claim 14, wherein said laser cutting is performed with a programmed pattern marker rather than a physical marker.

17. The method of claim 14, wherein said laser scribing and/or laser abrading is performed prior to said laser cutting.

18. The method of claim 14, wherein said laser scribing and/or laser abrading is performed subsequent to said laser cutting.

19. The method of claim 14, wherein said laser scribing and/or laser abrading is performed with a first laser and said laser cutting is performed with a second laser other than the first laser.

20. The method of claim 14, wherein said laser scribing and/or laser abrading is carried out to edges of the shaped panels.

21. A method of generating a design on a surface of a fabric with laser irradiation, comprising the steps of:
providing a laser system comprising software programmed with a plurality of designs based on a plurality of garment sizes and a plurality of garment styles;
selecting a design from the plurality of designs;
selecting a garment size and garment style from the plurality of garment sizes and the plurality of garment styles; and
laser abrading and/or laser etching, with the laser system, assembly information comprising at least one of stitching lines, assembly instructions, or notch markers on a fabric to serve as a guide for sewing.

22. The method of claim 21, wherein said laser abrading and/or laser etching comprises laser abrading and/or laser etching the stitch lines on the fabric.

23. The method of claim 21, wherein said laser abrading and/or laser etching comprises laser abrading and/or laser etching tech notch markers on the fabric.

* * * * *